United States Patent
Huang et al.

(10) Patent No.: US 9,762,889 B2
(45) Date of Patent: Sep. 12, 2017

(54) SUBTITLE DETECTION FOR STEREOSCOPIC VIDEO CONTENTS

(71) Applicant: SONY CORPORATION, Minato-ku (JP)

(72) Inventors: Chao Huang, Esslingen (DE); Takuto Motoyama, Stuttgart (DE); Yalcin Incesu, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 428 days.

(21) Appl. No.: 14/262,093

(22) Filed: Apr. 25, 2014

(65) Prior Publication Data

US 2014/0333720 A1 Nov. 13, 2014

(30) Foreign Application Priority Data

May 8, 2013 (EP) .................................. 13167084

(51) Int. Cl.
*H04N 13/00* (2006.01)
*G06K 9/32* (2006.01)
*G06K 9/00* (2006.01)
*H04N 21/488* (2011.01)

(52) U.S. Cl.
CPC ....... *H04N 13/007* (2013.01); *G06K 9/00208* (2013.01); *G06K 9/3266* (2013.01); *H04N 21/4884* (2013.01); *H04N 2013/0081* (2013.01)

(58) Field of Classification Search
None
See application file for complete search history.

(56) References Cited

U.S. PATENT DOCUMENTS

| 6,782,132 B1* | 8/2004 | Fogg ......................... G06T 1/20 |
| | | 348/716 |
| 8,766,973 B2* | 7/2014 | Thorpe ................. G06T 7/0075 |
| | | 345/419 |
| 2010/0220175 A1* | 9/2010 | Claydon .............. H04N 9/8715 |
| | | 348/43 |
| 2010/0328529 A1 | 12/2010 | Hirayama et al. |
| 2011/0116770 A1* | 5/2011 | Kobayashi ........... G11B 27/329 |
| | | 386/341 |
| 2011/0134210 A1* | 6/2011 | Tsukagoshi ........... G06T 7/0022 |
| | | 348/42 |
| 2011/0181593 A1* | 7/2011 | Hirai .................. H04N 13/0022 |
| | | 345/427 |

(Continued)

OTHER PUBLICATIONS

Lang, Manuel, et al. "Nonlinear disparity mapping for stereoscopic 3D." ACM Transactions on Graphics (TOG). vol. 29. No. 4. ACM, 2010.*

(Continued)

*Primary Examiner* — Mohammad J Rahman
(74) *Attorney, Agent, or Firm* — Oblon, McClelland, Maier & Neustadt, L.L.P.

(57) ABSTRACT

A right image and a left image is provided. Then a disparity estimation map relating to both images is provided and a left subtitle detection map for the left image and a right subtitle detection map for the right image are generated. Each map indicates subtitle areas within an image. For said subtitle areas and based on said disparity estimation map a subtitle disparity value for X and Y directions common for all subtitle areas is determined. Said left and right subtitle maps and said subtitle X and Y disparity values are used in an image interpolation process.

17 Claims, 10 Drawing Sheets

(56) References Cited

U.S. PATENT DOCUMENTS

| | | | |
|---|---|---|---|
| 2011/0210965 A1* | 9/2011 | Thorpe | G06T 7/593 345/419 |
| 2011/0211042 A1* | 9/2011 | Thorpe | H04N 13/0003 348/43 |
| 2011/0242104 A1* | 10/2011 | Zhang | H04N 13/0003 345/419 |
| 2011/0273532 A1* | 11/2011 | Kitazato | H04N 13/004 348/43 |
| 2011/0304691 A1* | 12/2011 | Newton | H04N 13/0018 348/43 |
| 2011/0310224 A1 | 12/2011 | Lee et al. | |
| 2012/0206567 A1 | 8/2012 | Zafarifar et al. | |
| 2012/0262546 A1* | 10/2012 | Tsukagoshi | H04N 13/0029 348/43 |
| 2012/0320153 A1* | 12/2012 | Barcons-Palau | H04N 13/0003 348/42 |
| 2013/0010062 A1* | 1/2013 | Redmann | H04N 5/278 348/43 |
| 2013/0069932 A1* | 3/2013 | Ha | H04N 13/026 345/419 |
| 2013/0120544 A1* | 5/2013 | Du | H04N 13/0048 348/51 |
| 2013/0321572 A1* | 12/2013 | Ho | H04N 13/0022 348/43 |
| 2014/0028798 A1* | 1/2014 | Tsukagoshi | H04N 19/597 348/43 |
| 2014/0055450 A1* | 2/2014 | Limonov | G06T 15/00 345/419 |
| 2014/0293003 A1* | 10/2014 | Robert | H04N 13/0022 348/42 |
| 2015/0181195 A1* | 6/2015 | Bruls | H04N 13/0022 348/43 |

OTHER PUBLICATIONS

Shivakumara et al., "Accurate Video Text Detection through Classification of Low and High Contrast", Pattern Recognition, vol. 43, Issue 6, Jun. 2010, pp. 2165-2185.*

Palaiahnakote Shivakumara, et al., "Accurate Video Text Detection Through Classification of Low and High Contrast Images", Pattern Recognition, vol. 43, Issue 6, Jun. 2010, 28 pages.

Office Action issued in Chinese Patent Application No. 201410193707.9, dated Dec. 30, 2016 with computer-generated English Translation.

* cited by examiner

SUBTITLE DETECTION FOR STEREOSCOPIC VIDEO CONTENTS

BACKGROUND

Field of the Disclosure

The present disclosure relates to a method for processing subtitles in 3D video content. In particular, the present disclosure relates to a method for detecting subtitles in 3D video content, the result of which being used in interpolating intermediate images, for example in multi-view 3D TV environments. The present disclosure also relates to a device for detecting subtitle areas in 3D image content as well as a computer program and a non-transitory recording medium.

Description of Related Art

In the art, applications are known realizing a detection of subtitle areas in video images. The detection of subtitle areas is helpful when interpolating intermediate frames which are required for frame rate up-conversion. One application is, for example, disclosed in US 2010/0328529 A1. This document discloses an approach to detect a still subtitle part included as a part of an image in a video signal.

Although the known applications for subtitle detection in video images are satisfying in 2D video image environments, they do not work with the desired accuracy in 3D video image environments, e.g. 3D multi-view systems requiring a depth/disparity estimation for interpolating images. However, the estimation process is difficult with objects covering each other, like subtitles resulting in wrongly assigned depth information to certain areas of the image. In particular, it may happen that when interpolating 3D images in a multi-view system, the disparity of subtitles is corrupted by background motion. When viewing 3D video images, an inaccurate or temporal unstable disparity of subtitles will lead to very visible and annoying artefacts. In contrast to normal 2D video content, a viewer knows exactly how subtitles should look like on the screen, and the viewer also expects that the subtitles have temporally stable depth impression.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide a method which overcomes the above-mentioned deficiencies. In particular, it is an object to provide a method which detects subtitles in stereoscopy 3D video images enabling an interpolation of 3D images containing subtitles with correct and temporally stable depth impression.

It is a further object to provide a device for detecting subtitle areas in 3D image content as well as a computer program for implementing the method and a non-transitory computer-readable recording medium for implementing the method.

According to an aspect there is provided a method comprising
  providing a right image and a left image,
  providing a disparity estimation map relating to both images,
  generating a left subtitle detection map for the left image and a right subtitle detection map for the right image, each map indicating subtitle areas within an image,
  for said subtitle areas and based on said disparity estimation map, determining a subtitle disparity value for X and Y directions common for all subtitle areas,
  using said left and right subtitle maps and said subtitle X and Y disparity values in an image interpolation process.

According to a further aspect, there is provided a device for detecting subtitle areas in 3D image content comprising a disparity estimation unit providing a disparity estimation map relating to a left and a right image, a subtitle detection unit adapted to detect subtitle text areas in left and right images for providing left and right subtitle detection maps, and a disparity extracting unit adapted to extract a common disparity X- and Y-value for the detected text areas.

According to still further aspects, a computer program comprising program means for causing a computer to carry out the steps of the method disclosed herein, when said computer program is carried out on a computer, is provided. Also, a non-transitory computer-readable recording medium that stores therein a computer program product, which, when executed by a processor, causes the method disclosed herein to be performed, is provided.

Preferred embodiments are defined in the dependent claims. It shall be understood that the claimed device, the claimed computer program and the claimed computer-readable recording medium have similar and/or identical preferred embodiments as the claimed method and as defined in the dependent claims.

One of the aspects of the present disclosure is to implement a subtitle/text detection method which is designed for subtitle detection and subtitle disparity assignment for stereoscopic 3D video content. In particular, this method makes use of the fact that the same subtitle appears in both left and right images, only having different positions due to disparity. The result of the subtitle detection and the result of the disparity estimation are used as to provide a common subtitle disparity value for both directions, namely X and Y direction, so that a temporarily stable depth impression is achieved.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 14:
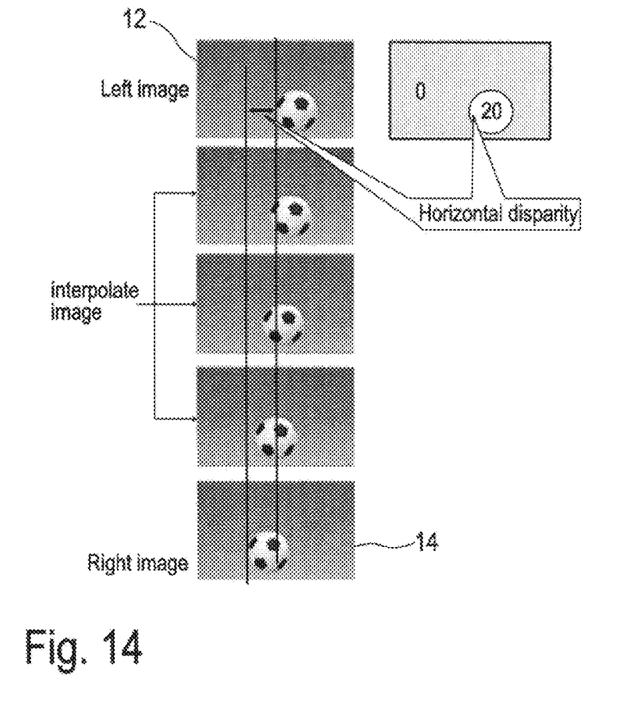
FIG. 14 illustrates a disparity and interpolation scheme in a multi-view system.

In the art, so-called multi-view systems realizing glassless 3D TV are known. In such systems it is necessary to interpolate intermediate images between left and right input images as to achieve different depth impressions when watching a TV from different viewpoints. As for example shown in FIG. 14, a left image 12 and a right image 14 contain objects which are spatially displaced in X and/or Y direction. In FIG. 14, for example, the object "football" is spatially displaced by, for example, 20 pixels to the left from the left image 12 to the right image 14. This spatial displacement which is called "disparity" achieves the 3D stereoscopic impression. In the art, techniques for estimating the disparity between left and right images are known and provide a so-called disparity estimation map containing a disparity value for pixels or pixel blocks of an image (which could also be called "frame").

In a multi-view system, it is now required to interpolate images for different use. Such interpolated images have to provide different depth impressions compared to the left and right images 12, 14 due to a different viewpoint. Therefore, the image processing of such a multi-view system has to interpolate disparity values on the basis of the disparity estimation map for the left and right images 12, 14. This is illustrated in FIG. 14 by changing the spatial displacement of the "football".

Figure 15:
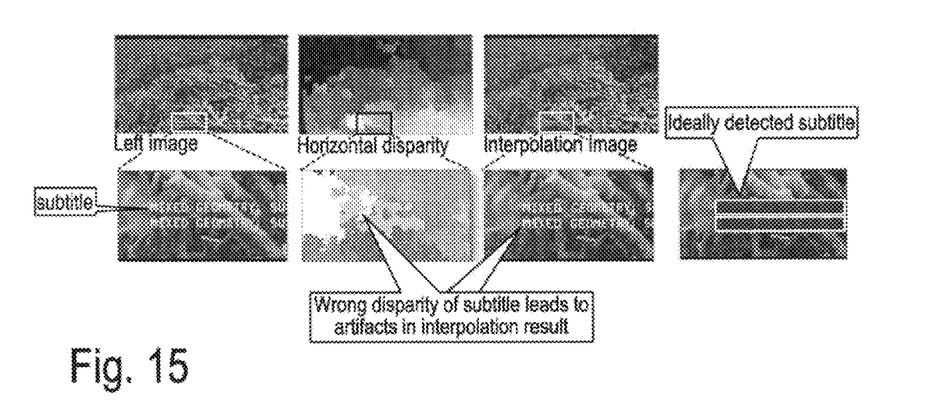
FIG. 15 illustrates the result of wrong disparity and artefacts of subtitles.

If the left and right images, hence the stereoscopic input video content, contain subtitles, the disparity of subtitles could be corrupted, for example, by a background motion, as illustrated in FIG. 15. When viewing 3D video content, an inaccurate or temporally unstable disparity of subtitles will lead to very visible and annoying artefacts. In contrast to normal video content, the viewer knows exactly how subtitles should look like on the screen, and the viewer also expects that the subtitles have temporally stable depth impression.

The method and device according to the present disclosure and described below will allow to provide very accurate and stable subtitle detection and subtitle disparity information.

Referring now to FIGS. 1 to 13, the method and device according to the present disclosure are described. It is to be noted that the block diagrams illustrated in the figures are used to indicate functional units both for the method and the device. A functional unit realizes a predetermined function and, therefore, represents both a method step and a system or device unit.

Figure 1:
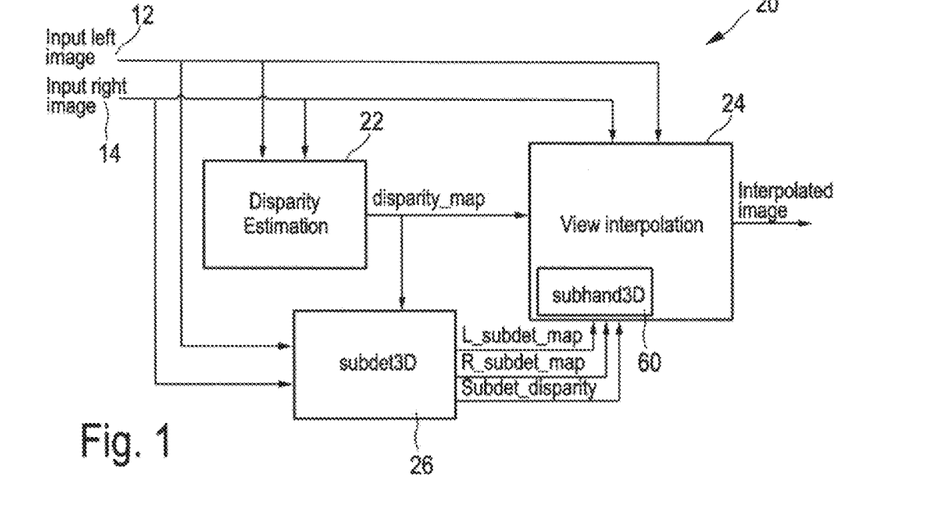
FIG. 1 shows a block diagram of an image processing system for view interpolation.

FIG. 1 shows an image processing system 20 which is adapted to provide interpolated images as output. The input of this image processing system 20 are left and right image pairs 12, 14 of a 3D video, for example. The image processing system comprises three main units or modules, namely a disparity estimation unit 22, an interpolation unit 24 and a subtitle detection unit 26. The disparity estimation unit 22 and the interpolation unit 24 will not be described in detail because their functionality is known and not necessary for describing the present disclosure which is implemented in the subtitle detection unit 26.

The subtitle detection unit 26 receives as input the left image and the right image 12, 14 and the disparity estimation map calculated by the disparity estimation unit 22 using, for example, recursive block matching algorithms.

The subtitle detection unit 26 generates two bitmaps, namely a left subtitle detection map L_subdet_map and a right subtitle detection map R_subdet_map, which contain the location of detected subtitles in the current left and right images/frames, respectively.

Further, the subtitle detection unit 26 also calculates horizontal and vertical disparities (dx, dy) for the subtitles, indicated as subdet_disparity in FIG. 1.

On the basis of the subtitle detection maps and the subtitle disparities, the interpolation unit 24 interpolates intermediate images.

Figure 2:
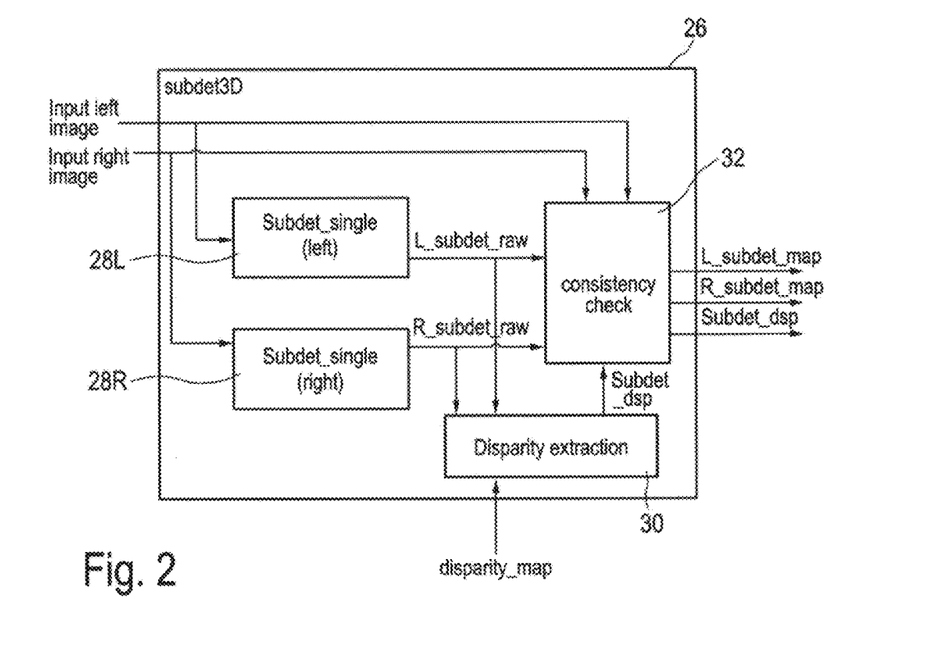
FIG. 2 shows a block diagram of a subtitle detection unit.

In FIG. 2, the subtitle detection unit 26 is shown in more detail. The subtitle detection unit 26 comprises a subtitle detection single unit 28L for the left images and a subtitle detection single unit 28R for the right images. Both subtitle detection single units 28L, 28R are similarly designed and operate similarly, so that in the following it is only referred to a subtitle detection single unit 28. The subtitle detection single unit 28 receives left or right images and delivers a raw bitmap L_subdet_raw or R_subdet_raw, the raw bitmap indicating subtitle positions for each input image.

As an alternative the raw bitmaps L_subdet_raw or R_subdet_raw could contain more than a single bit per image pixel or pixel block. This allows to give more information, e.g. a probability value indicating the probability of a pixel to be a subtitle rather than just stating whether the pixel/pixel block is a subtitle or not. The advantage of a non-binary map would be that the interpolation process could use this information to apply spatial robust interpolation methods to reduce e.g. pixel errors.

The output of both subtitle detection single units 28 is supplied to a disparity extracting unit 30 which also receives the disparity map from the disparity estimation unit 22. The disparity extracting unit 30 is adapted to extract the disparities of subtitles from the disparity maps. The result and hence output is indicated with subdet_dsp, which preferably comprises a disparity value for X direction and a disparity value for Y direction.

The subtitle detection unit 26 further comprises a consistency check unit 32 which receives the output of the subtitle detection single units 28 and the disparity extracting unit 30. Further, the consistency check unit 32 also receives as an input the left and right images.

The output of the consistency check unit 32 are the subtitle detection maps and the subtitle disparity indicated as subdet_desp.

The consistency check unit 32 is generally adapted to evaluate the consistency between left and right subtitle detection results with the help of the disparity information. For example, this can be done by applying post matching on the subtitle area.

Figure 3:
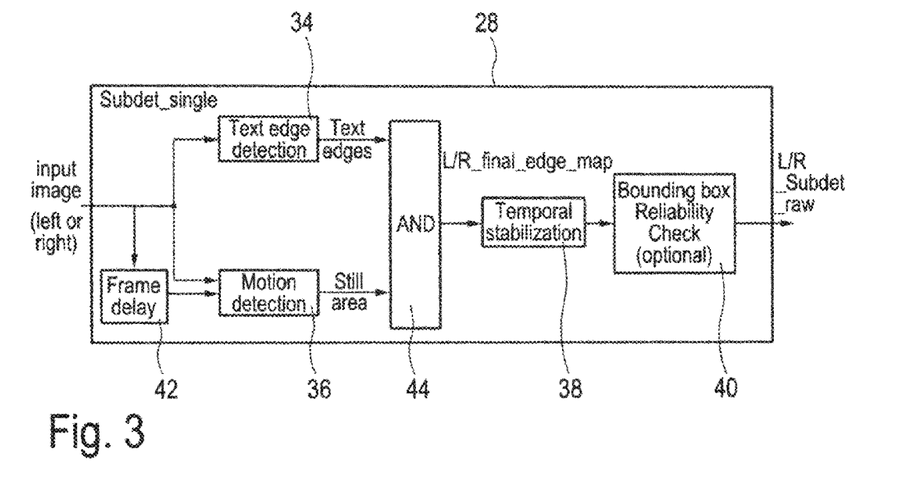
FIG. 3 shows a block diagram illustrating the process of subtitle detection.

Referring now to FIG. 3, the subtitle detection single unit 28 is shown in more detail with the functional blocks necessary for providing a subtitle detection raw bitmap L/R_subdet_raw.

The subtitle detection single unit 28 comprises a text edge detection unit 34, a motion detection unit 36, a temporal stabilization unit 38 and, optionally, a bounding box reliability check unit 40.

The text edge detection unit 34 as well as the motion detection unit 36 both receive the input image 12, 14. The motion detection unit 36 also receives a delayed input image from a frame delay unit 42, so that the input of the motion detection unit 36 is an image of time t and an image of time t−1.

The output of the text edge detection unit 34 is preferably a binary map in which text edges are indicated with binary 1 and non-text edges with binary 0.

The output of the motion detection unit 36 is a binary map which indicates areas of motion and an area of no motion. Preferably, a binary value of 1 represents an area of no motion and a binary value of 0 represents an area with motion. The motion detection unit 36 uses known matching algorithms for finding corresponding objects/areas in two images.

The text edge detection carried out by the text edge detection unit 34 is designed to detect text-specific edges and ignore non-text edges. In contrast to known edge detection techniques, the text edge detection should reduce false positives in the detection results.

Figure 4:
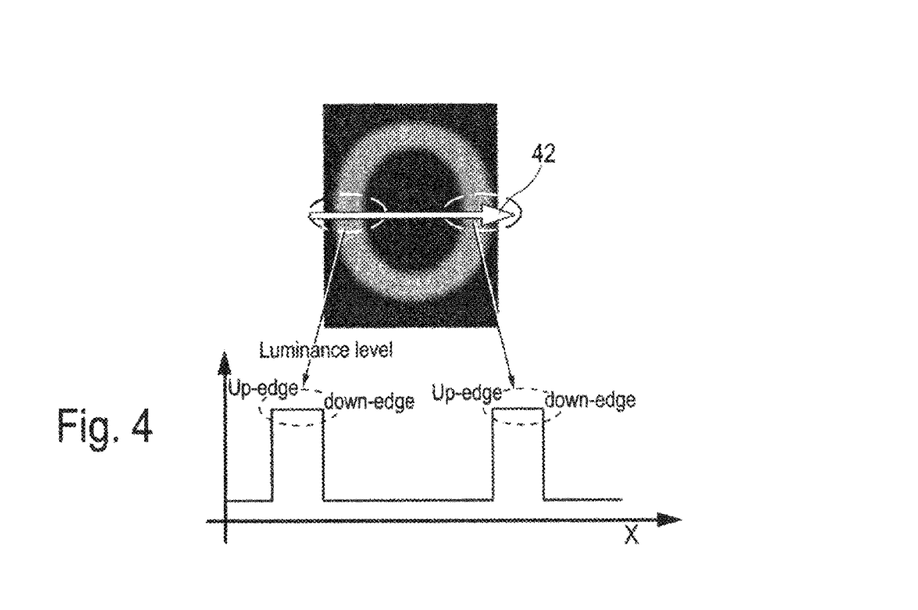
FIG. 4 shows a diagram for illustrating the text edge detection.

The main idea implemented in the text edge detection unit 34 is to detect text "up-down" edge pairs, as shown in FIG. 4.

For example, if the image is scanned from left to right as shown by the arrow 42 in FIG. 4, changes of luminance level can be found. These luminance level changes are image edges and always appear in up- and down-edge pairs.

Therefore, the first step in the text edge detection is to detect all edges in an image by using a gradient filter, for example a sobel filter, and then to classify them.

Figure 5:
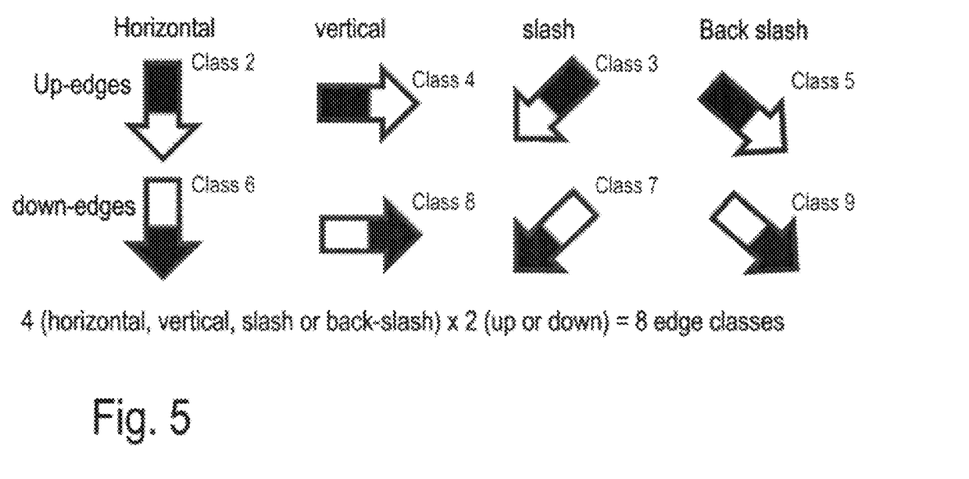
FIG. 5 shows a diagram for illustrating text edge classification.

In FIG. 5, several edge classifications are shown. In particular, eight edge classes are shown, namely two horizontal, two vertical, two slash and two backslash classes. In this classification scheme, class 1, which is not shown in FIG. 5, is representing "no edge", when for example the gradient is not strong enough to be an edge.

For example, class 2 means a scan direction top-down with a luminance level change from low (indicated by black) to high (indicated by white). Hence, it is a horizontal up-edge.

Now, the next step in text edge detection is to find corresponding text edge pairs. For example, within a given maximum of character width, for example ten pixels, there must be a corresponding pair. Particularly, there must be an up- and down-edge pair, namely a pair classified with 2-6 or 4-8 or 3-7 or 5-9.

Single edges for which no edge pairs could be found, are considered to be non-text edges.

Figure 6:
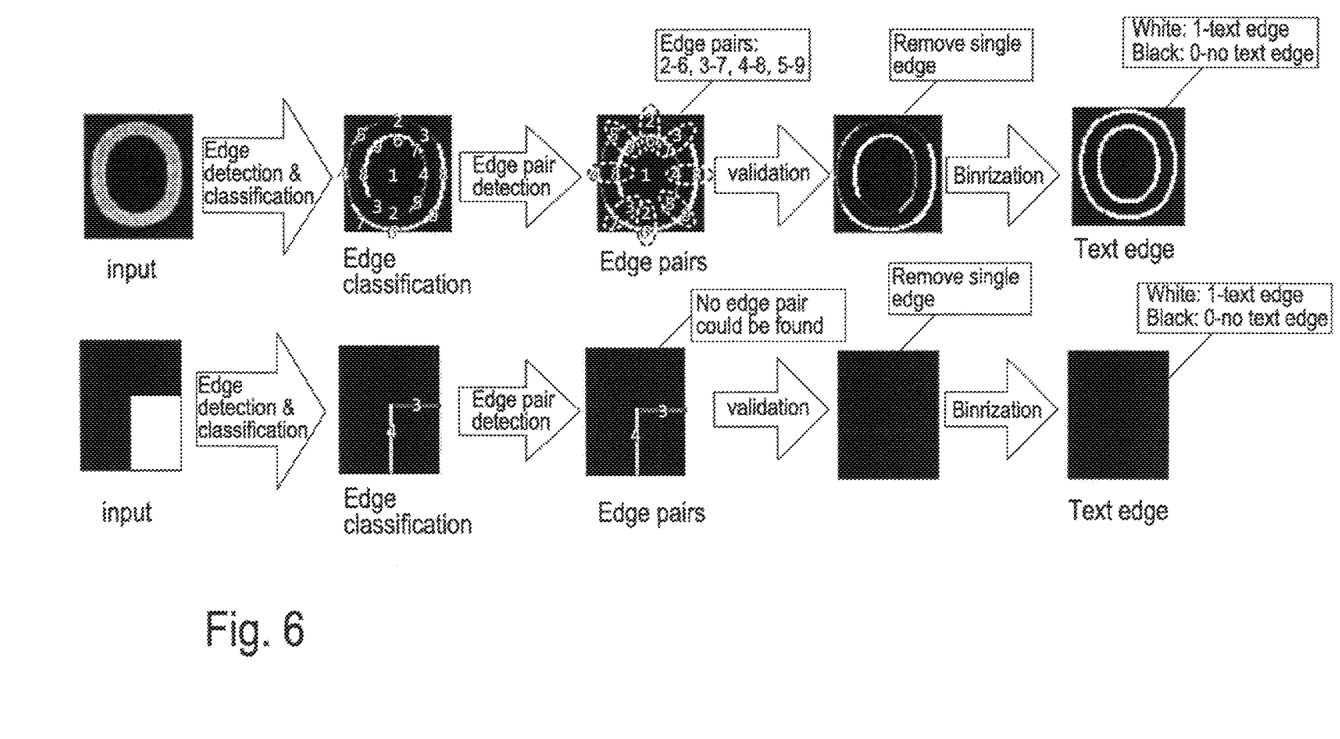
FIG. 6 shows a diagram to illustrate text edge detection.

In the next step, a binarization is applied on the edge classification map to get the text edges, as shown in FIG. 6.

In the upper row of FIG. 6, an image with text content is input into the text edge detection unit 34. After edge detection and edge classification, edge pairs for each edge pixel are found. In this way, the text edges can be detected. As shown in the upper row, the result of the edge detection is a binary map containing binary 1 for text edges and binary 0 for no text edges.

In the lower row of FIG. 6, the input image shows a normal image content with no text in it. After the edge detection and edge classification steps, no edge pairs can be found. So, the single edges are removed and the final text edge detection result shows that there are no text edges in this image. The binary map contains, therefore, only binary 0.

Figure 7:
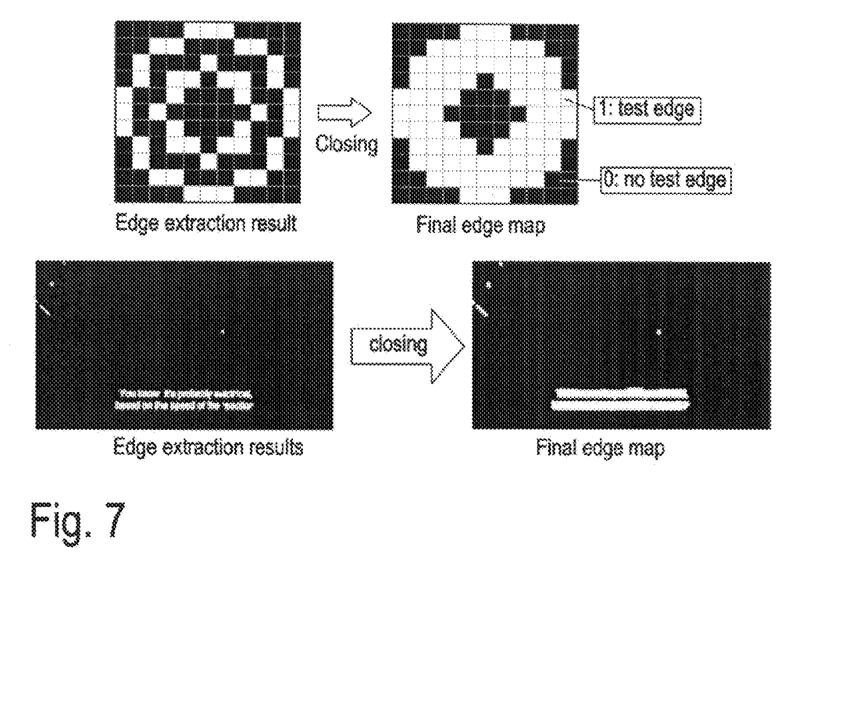
FIG. 7 shows a diagram illustrating the step of text edge closing.

In the final step of the text edge detection carried out by the text edge detection unit 34, the space between edges is closed, as shown in FIG. 7. In other words, this step detects the outline of text and fills the gap between the pair of edges with binary 1. After this operation also dilation and erosion filter operations can be applied to fill the gaps.

The binary map provided by the text edge detection unit 34 indicates text with binary 1 and no text with binary 0. Here it is to be noted that the map could also contain non-binary values giving more information as just indicating yes/no for text. The map could contain a probability value indicating the probability that text is present or not.

The mentioned detection carried out by the motion detection unit 36 is done to detect still areas in the video content. Assuming that subtitles should be static throughout some images/frames, detected text edges of subtitles should lie in still areas. The detection of still areas could, therefore, be used for validation of the detected text.

The motion detection unit 36 calculates frame differences between two consecutive frames and outputs subtitles information in pixel resolution. For example, if the absolute pixel difference is smaller than a predetermined threshold stillTh, this pixel is detected as still area. On the other hand, if the absolute frame difference is larger than the given threshold, the pixel is detected as motion area. The equation below describes the function carried out by the motion detection unit 36.

$$\text{still}(x, y) = \begin{cases} 1 & (|\text{in}(x, y, t) - \text{in}(x, y, t-1)| < \text{stillTh}) \\ 0 & (\text{other}) \end{cases}$$

where in(x,y,t) means input luminance image pixel value at position (x, y) and time t and still (x, y) is the still area information at position (x, y).

Hence, the result of the motion detection unit 36 is a binary map comprising binary 1 for still area and binary 0 for motion areas.

The output of the text edge detection unit 34 and the motion detection unit 36 are supplied to a logical AND gate 44 which combines them to form the left/right final edge map L/R_final_edge_map.

This result is supplied to the temporal stabilization unit 38 which is adapted to check the reliability of subtitle regions based on its temporal continuity. Subtitle usually exists over several frames at the same position continuously. Therefore, this unit detects the continuity of subtitle detection results and generates the mask data for subtitle detection results based on history of detection results.

Figure 8:
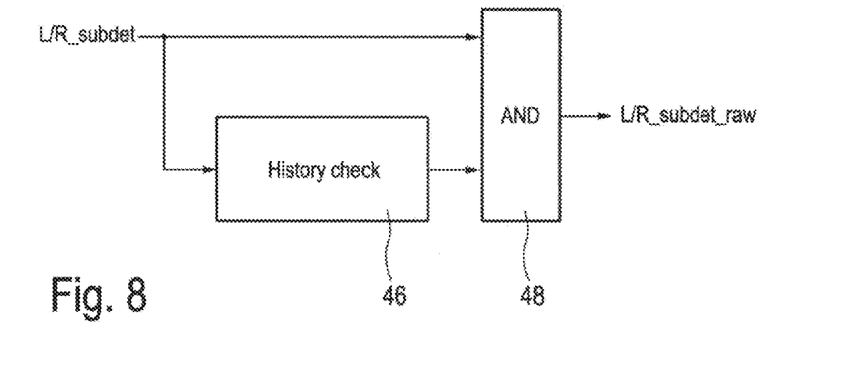
FIG. 8 shows a block diagram describing the step of temporal stabilization.

In FIG. 8, the step of temporal stabilization is illustrated in form of a block diagram which comprises a history check unit 46 and a logical AND gate 48.

The continuity of subtitle detection results can be detected as follows:

$$\text{history}(x, y, t) = \begin{cases} \min(\text{history}(x, y, t-1) + 1, \text{histmax}) & (\text{sub det}(x, y) = 1) \\ \max(\text{history}(x, y, t-1) - 1, 0) & (\text{other}) \end{cases}$$

where subdet(x, y) is the current subtitle detection result at position (x, y), history (x, y, t) is the history data at position (x, y) and time t and histmax is the upper limit value of history.

After this history calculation, the mask data is generated as follows:

$$\text{history\_mask}(x, y) = \begin{cases} 1 & (\text{history}(x, y, t) > histTh) \\ 0 & (\text{other}) \end{cases}$$

At the end, this mask data is combined by the logical AND gate 48 with the current subtitle detection result L/R_final_edge_map.

The output of the temporal stabilization unit 38 is then supplied to the bounding box reliability check unit 40 which carries out further steps to reduce false positives in the supplied binary map. The unit 40 generates so-called bounding boxes around the detected subtitle areas. Each bounding box consists of four parameters to describe subtitle area positions:
bb_i_x: X coordinate of left upper corner,
bb_i_y: Y coordinate of left upper corner,
bb_i_w: width of bounding box,
bb_i_h: height of bounding box,
where i is the index of the bounding box.

Figure 9:
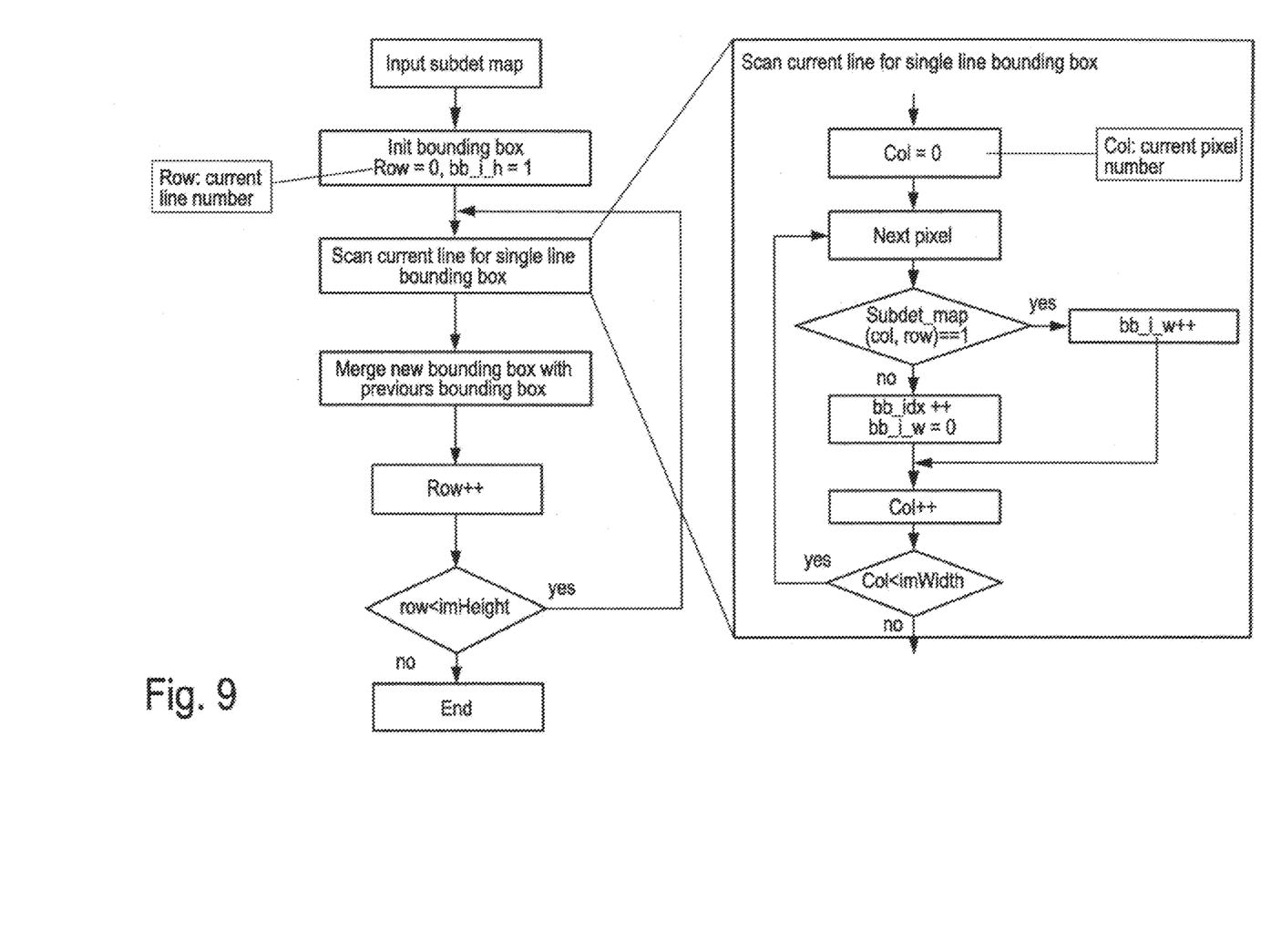
FIG. 9 shows a flow diagram illustrating the method of determining bounding areas/boxes.
Figure 10:
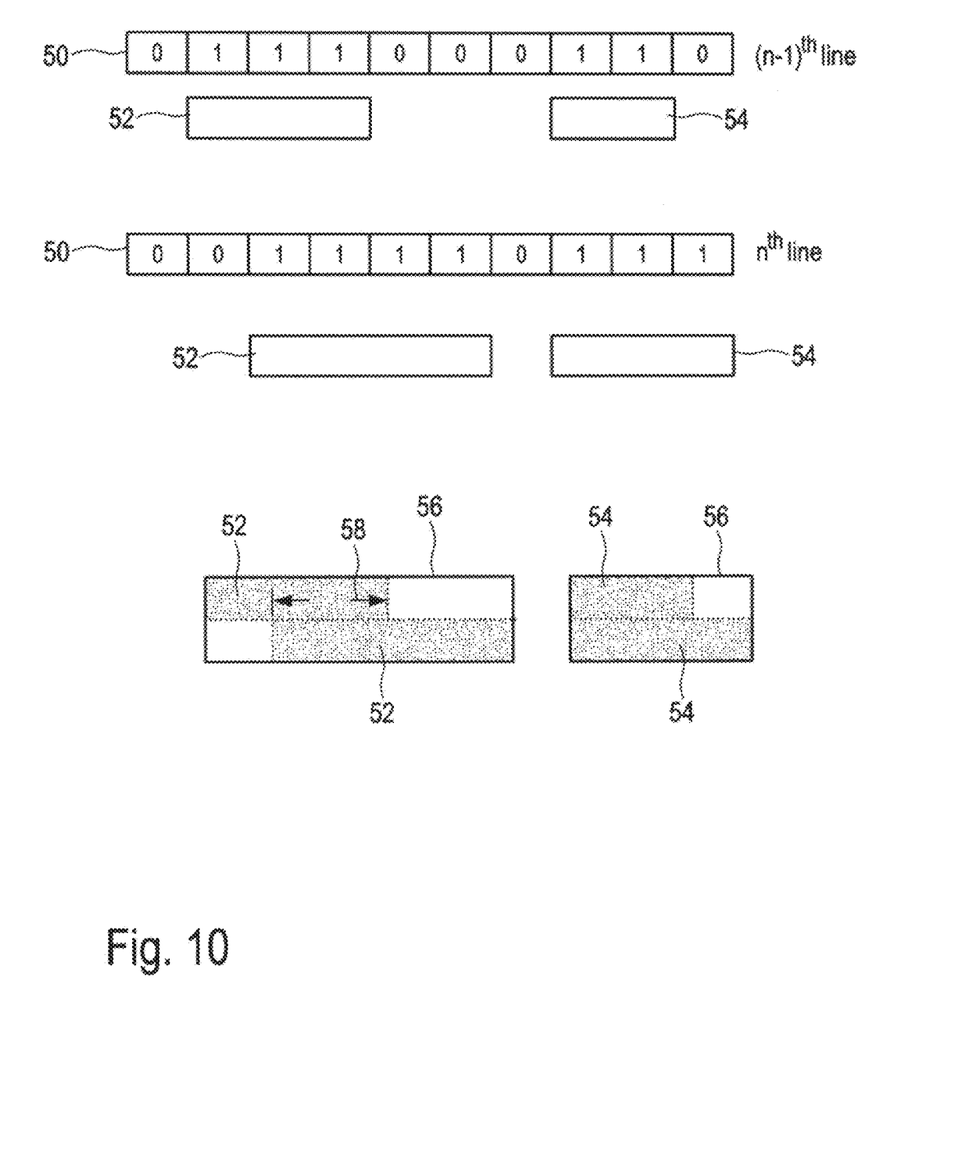
FIG. 10 shows a diagram for describing the step of determining bounding boxes in more detail.

FIG. 9 shows an example of the bounding box generation in form of a flow diagram. This method scans each line of the supplied binary map and forms boxes of height 1 (one pixel) and a width bb_i_w dependent on the number of detected binary 1 in a consecutive order. In FIG. 10, a portion of a row/line of the supplied binary map is shown and indicated with reference numeral 50. When scanning this line (N−1), for example from left to right, the method recognizes three consecutive binary 1 forming a first bounding box 52 with width 3. Further, in the same line, the method generates a further box 54 having a width of 2.

In other words, a bounding box 52, 54 represents a series of consecutive binary 1 in a line or row of the supplied binary map.

As further shown in FIG. 10, the next line (indicated with Nth line) is scanned and boxes 52, 54 are generated, which, however, do not correspond with boxes 52, 54 generated in the former scan line (N−1).

In the next step which is described with "merge new bounding box with previous bounding box" in FIG. 9, the bounding boxes will be merged to the bounding boxes in the (N−1)th image line as long as they have intersections in horizontal direction. The result of such a merging step of bounding boxes is also shown in FIG. 10 and indicated with reference numerals 56. A merged bounding box 56 has a rectangular form and covers the bounding boxes 52 or 54 of two consecutive scans. However, only those bounding boxes are merged which have a horizontal intersection overlap indicated with 58.

Figure 11:
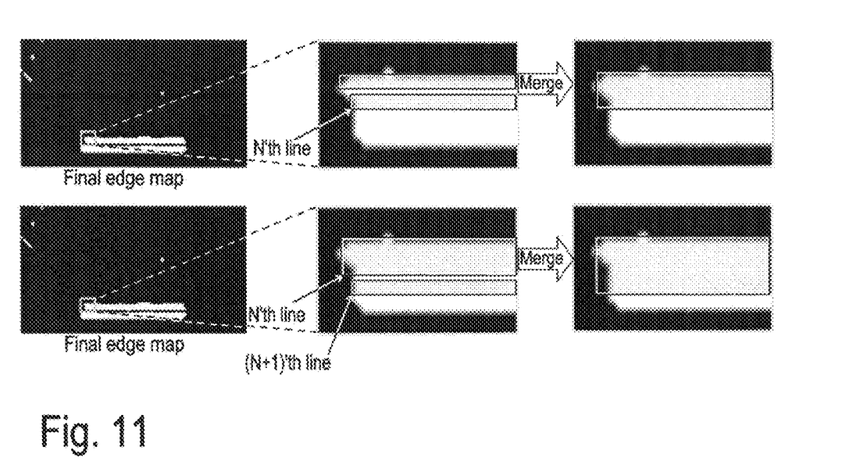
FIG. 11 shows examples of bounding box generation via box merging.

After having scanned the whole map, bounding boxes are known. A further example of bounding box generation via bounding box merging is shown in FIG. 11.

Figure 12:
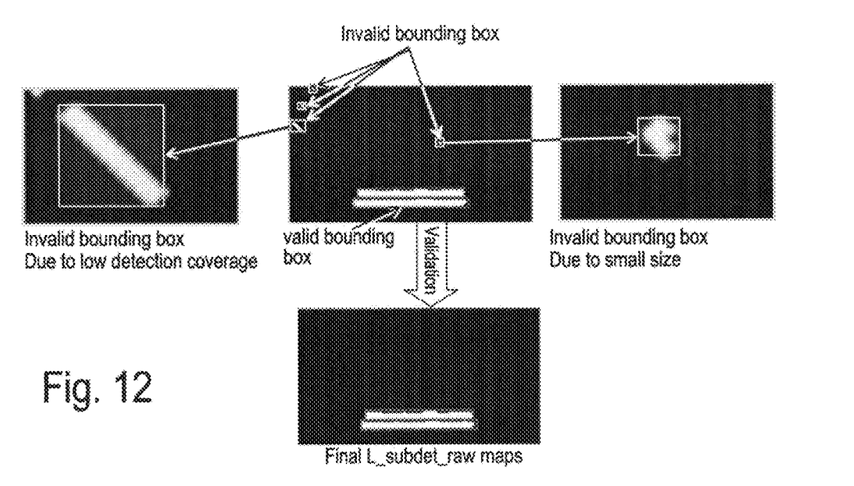
FIG. 12 shows a diagram for illustrating bounding box validation.

In the next step, a bounding box can be verified on the basis of its size and its detection coverage. First, subtitles are readable texts, so they are not allowed to be too small or too big. So, it is possible to set four thresholds (w_min, w_max, h_min, h_max in pixel) to limit the valid horizontal and vertical size.

For example, as shown in the right image of FIG. 12, an invalid bounding box is detected due to its too small size.

Another verification method is to use detection coverage which is defined as a number of pixels detected as subtitle inside a bounding box, divided by the total number of pixels of this bounding box. After the step of closing the gap between edge detection pairs, as mentioned above, the subtitle detection results usually have a relatively high local detection coverage, so it can also be set a detection coverage threshold (cov_min in %). Bounding boxes which have less detection coverage than cov_min are invalid. The result of the bounding box reliability check is the left/right raw subtitle detection map L/R_subdet_raw which is provided to the consistency check unit 32 as shown in FIG. 2.

In FIG. 2 it is shown that the consistency check unit 32 also receives a result of the disparity extraction unit 30. This disparity extracting unit 30 determines one common horizontal disparity (dx) and one common vertical disparity (dy) for all subtitles detected in one frame/image. This is based on the assumption that subtitles should have the same disparity in one frame.

This disparity information can be extracted from the disparity maps supplied by the disparity estimation unit 22. Most of the subtitle disparities are correct and only some of them are affected by the background motion, as described with reference to FIG. 15. The main idea is to identify the common disparity values, for instance, by a histogram analysis of related regions of interest. These regions are the areas covered by the bounding boxes or the raw subtitle area after the bounding box validation. In other words, only the disparity values of the disparity maps are considered which belong to the areas indicated by the bounding boxes and the subtitle area, respectively.

As shown in FIG. 2, the inputs of the disparity extracting unit 30 are the disparity maps from the disparity estimation unit 22 and the subtitle detection raw maps from the subtitle detection single units 28L and 28R. Preferably, the disparity estimation unit supplies four disparity maps, namely a left to right horizontal disparity map (dlx), a left to right vertical disparity map (dly), a right to left disparity map (drx) and a right to left vertical disparity map (dry). The dlx and dly maps describe the pixel displacement of left and right images, with the reference image being the left image. The drx and dry maps use the right image as reference image. The L/R_subdet_raw maps indicate the location of the subtitles and they can be used as masks for disparity extracting.

To sum up, the disparity extracting unit 30 analyzes the disparity values in the areas of the bounding boxes or the raw subtitle after the bounding box validation and selects one X disparity value and one Y disparity value according to predetermined criterion. As a result, there is a common X disparity value and a common Y disparity value for all subtitle areas.

The consistency check unit 32 now applies a consistency check on the supplied left and right subtitle detection raw maps using the common disparities dx and dy supplied by the disparity extracting unit 30. A possible way to do this consistency check is post matching described by the following equation:

$$L\_subdet\_raw(x, y) =$$

$$\begin{cases} 1 & (\text{abs}(L\_input(x + dx, y + dy) - R\_input(x, y)) \le diffTh) \\ 0 & (\text{abs}(L\_input(x + dx, y + dy) - R\_input(x, y)) > diffTh) \end{cases}$$

$$R\_subdet\_raw(x, y) =$$

$$\begin{cases} 1 & (\text{abs}(R\_input(x - dx, y - dy) - L\_input(x, y)) \le diffTh) \\ 0 & (\text{abs}(R\_input(x - dx, y - dy) - L\_input(x, y)) > diffTh) \end{cases}$$

where R_input are the grey image values of the left and right input images, and dx and dy are the common disparity values.

As mentioned before, the subtitle detection maps, i.e. the maps L_subdet_raw and R_subdet_raw could be provided as non-binary maps. In this case, the difference value according to the equation above is not compared to the threshold value diffTh but is directly stored in the map as a non-binary value. The non-binary maps would be useful in further image processing, e.g. in a later interpolation process.

Figure 13:
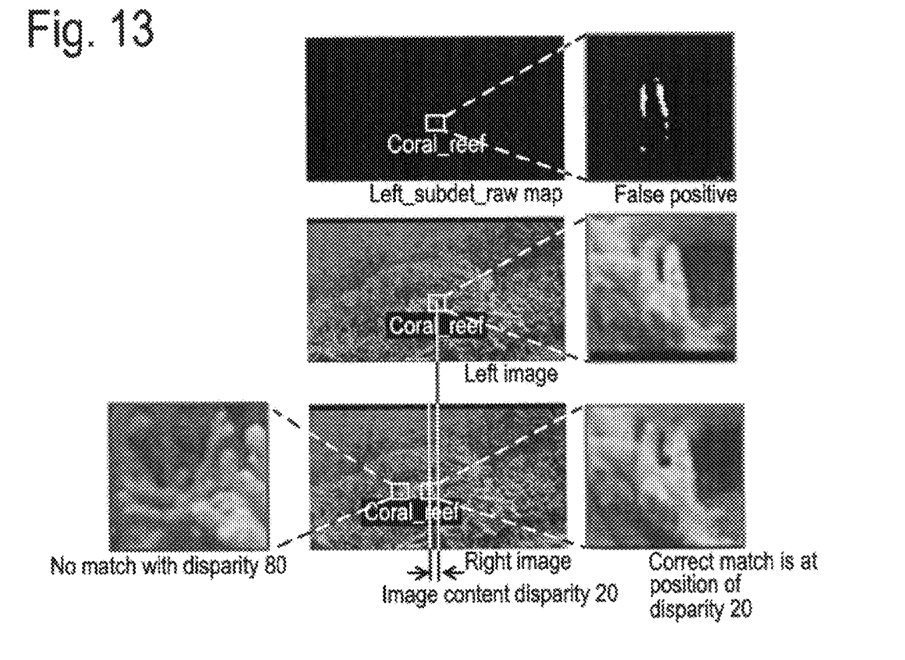
FIG. 13 shows a diagram illustrating the result of text edge detection.

FIG. 13 shows a simple example of the consistency check. The left figure shows that the subtitle horizontal disparity dx is 80. Since the vertical disparity is 0, it is not shown in the figure. In the lower figure it can be seen that the green marked image part has a horizontal disparity of 20. It is assumed that the correct disparities are extracted by the disparity extraction unit. In the consistency check unit, the subtitles in the left image are projected on the right image position. That means in this example, that the image pixels which are detected in the left_subdet_raw map in the left image are shifted 80 pixels to the left, and then it is compared to the right image. The correct detection will get a good match (upper figure) and false positives will get no match (lower figure). This consistency check is applied on both left to right projection and right to left projection, so that the false positives on both left and right subtitle detection raw maps will be removed.

Hence, the consistency check unit 32 provides very accurate subtitle detection maps for the left and the right images, L_subdet_map and R_subdet_map, together with a common subtitle detection disparity subdet_dsp. These results are supplied to the interpolation unit 24 and are processed by a subtitle handling unit 60, so that intermediate images can be interpolated having accurate and stable depth impression in the subtitle areas. Moreover the subtitle area information can be used to adjust the subtitle position (back or front) according to a user preference by replacing a disparity value of the subtitle area with a given disparity value from the user.

As already mentioned before, the block diagrams shown in FIGS. 1, 2 and 3 are used to illustrate functional components of the method and the device. Hence, each block or unit represents a method step as well as a module of an image processing circuit.

The present disclosure provides a subtitle detection which is especially designed for stereoscopic 3D video contents. One of the aspects of this detection is a very accurate text edge detection which reduces false positives caused by non-text edges and the consistency check also increasing accuracy of the subtitle detection.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

The present application claims priority to European Patent Application 13 167 084.6, filed in European Patent Office on May 8, 2013, the entire contents of which being incorporated herein by reference.

The invention claimed is:

1. A method comprising:
providing a right image and a left image in circuitry,
providing, in the circuitry, a disparity estimation map relating to both images,
generating, using the circuitry, a left subtitle detection map for the left image and a right subtitle detection map for the right image, each map indicating subtitle areas within an image,
for said subtitle areas and based on said disparity estimation map, determining, using the circuitry, a subtitle disparity value for X and Y directions common for all of the subtitle areas,
evaluating, using the circuitry, a consistency between the left subtitle detection map and the right subtitle detection map by comparing image data of the subtitle areas in the right image to image data of the subtitle areas in the left image when the subtitle areas in the right image and the subtitle areas in the left image are shifted relative to each other by an amount determined by the subtitle disparity value for the X and Y directions;
detecting, using the circuitry, false positives in generation of the left subtitle detection map and the right subtitle detection map in accordance with the consistency, and
using said left and right subtitle maps and said subtitle X and Y disparity values in an image interpolation process, using the circuitry.

2. A non-transitory computer-readable recording medium that stores therein a computer program product, which, when executed by a processor, causes the method according to claim 1 to be performed.

3. A device for detecting subtitle areas in 3D image content, the device comprising
circuitry configured to
provide a disparity estimation map relating to a left image and a right image,
detect subtitle text areas in left and right images for providing left and right subtitle detection maps,
a disparity extracting unit adapted to extract a common subtitle disparity X- and Y-value for the detected text areas,
evaluate a consistency between the left subtitle detection map and the right subtitle detection map by comparing image data of the subtitle areas in the right image to image data of the subtitle areas in the left image when the subtitle areas in the right image and the subtitle areas in the left image are shifted relative to each other by an amount determined by the subtitle disparity value for the X and Y directions;
detect false positives in generation of the left subtitle detection map and the right subtitle detection map in accordance with the consistency, and use said left and right subtitle maps and said subtitle X and Y disparity values in an image interpolation process.

4. The device of claim 3, wherein the circuitry is configured to generate the subtitle detection map by applying a text edge detection on said image for providing a binary text edges map indicating text specific edges, and applying a motion detection on said image and a previous image for providing a still area map indicating areas with motion and without motion.

5. The device of claim 4, wherein the circuitry is configured to AND gate said binary text edges map and said still area map to provide a binary final edge map.

6. The device of claim 4, wherein the circuitry is configured to perform said text edge detection by detecting up-down edge pairs in said image indicating up-down changes of luminance level.

7. The device of claim 6, wherein the circuitry is configured to perform said detecting by applying a gradient filter.

8. The device of claim 7, wherein the circuitry is configured to classify said luminance level changes.

9. The device of claim 5, wherein the circuitry is configured to apply a temporal stabilization to said binary final edge map.

10. The device of claim 9, wherein the circuitry is configured to perform said temporal stabilization by evaluating a continuity of successive binary final edge maps.

11. The device of claim 3, wherein the circuitry is configured to merge contiguous subtitle areas to rectangular bounding areas.

12. The device of claim 11, wherein the circuitry is configured to evaluate said bounding areas and discard bounding areas not fulfilling a predetermined criterion.

13. The device of claim 12, wherein the circuitry is configured such that said criterion is the size of the rectangular bounding area.

14. The device of claim 13, wherein the circuitry is configured to discard a bounding area as invalid if its area size is smaller than a predetermined value.

15. The device of claim 12, wherein the circuitry is configured to determine the subtitle disparity value by evaluating the disparity estimation map in the bounding areas and determining a common disparity value for X- and Y-direction on the basis of the evaluating.

16. The device of claim 15, wherein the circuitry is configured to perform the evaluating by applying a histogram analysis of the disparity values in the bounding areas and selecting the disparity value of the highest frequency.

17. The device of claim 15, wherein the circuitry is configured such that an output of evaluating the consistency is a binary value indicating a match.

* * * * *